(12) United States Patent
Kang et al.

(10) Patent No.: US 8,623,497 B2
(45) Date of Patent: Jan. 7, 2014

(54) TOUCH SCREEN PANEL AND FABRICATING METHOD FOR THE SAME

(75) Inventors: Sung-Ku Kang, Yongin (KR); Mikiya Itakura, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 35 days.

(21) Appl. No.: 12/929,190

(22) Filed: Jan. 6, 2011

(65) Prior Publication Data

US 2011/0268936 A1    Nov. 3, 2011

(30) Foreign Application Priority Data

Apr. 28, 2010  (KR) .................. 10-2010-0039539

(51) Int. Cl.
- B32B 7/02    (2006.01)
- B32B 3/00    (2006.01)
- B32B 7/14    (2006.01)
- B05D 5/12    (2006.01)

(52) U.S. Cl.
USPC .................. 428/212; 428/203; 427/126.3

(58) Field of Classification Search
USPC .......... 359/580, 582, 585–590; 428/212–220, 428/203; 427/126.3
See application file for complete search history.

(56) References Cited

U.S. PATENT DOCUMENTS

| | | | | |
|---|---|---|---|---|
| 2001/0055673 A1* | 12/2001 | Getz | .............................. | 428/212 |
| 2004/0151895 A1* | 8/2004 | Itoh et al. | ....................... | 428/327 |
| 2006/0017707 A1* | 1/2006 | Fukui et al. | .................... | 345/173 |
| 2006/0290409 A1* | 12/2006 | Noguchi et al. | .............. | 327/517 |

FOREIGN PATENT DOCUMENTS

| | | | |
|---|---|---|---|
| KR | 10 2005-0011296 A | 1/2005 |
| KR | 10 2007-0046137 A | 5/2007 |
| KR | 10 2008-0045226 A | 5/2008 |
| KR | 10 2009-0078235 A | 7/2009 |
| KR | 10 2009-0127283 A | 12/2009 |
| KR | 10 2010-0006987 A | 1/2010 |
| KR | 10 2010-0019480 A | 2/2010 |

OTHER PUBLICATIONS

Machine Translation of KR 10-2009-0127283.*
Machine Translation of KR 10-2010-0006987.*
Korean Office Action in KR 10-2010-0039539, dated Feb. 13, 2012 (Kang, et al.).
Korean Office Action in KR 10-2010-0039542, dated Jun. 24, 2011 (Kang, et al.).

* cited by examiner

Primary Examiner — Gerard Higgins
Assistant Examiner — Sathavaram I Reddy
(74) Attorney, Agent, or Firm — Lee & Morse, P.C.

(57) ABSTRACT

A touch screen panel, including a substrate having a plurality of sensing patterns thereon, and an anti-reflection layer on the substrate, the anti-reflection layer including at least two inorganic materials and having a stacked structure of at least two layers having different refractive indexes, layers of the anti-reflection layer being divided from a mixture by a difference in specific gravity of the least two inorganic materials.

15 Claims, 3 Drawing Sheets

TOUCH SCREEN PANEL AND FABRICATING METHOD FOR THE SAME

BACKGROUND

1. Field

Embodiments relate to a touch screen panel and a fabricating method for the same.

2. Description of the Related Art

A touch screen panel may be used as an input device that selects instructions displayed on a screen (such as an image display device, etc.) using a person's hand or an object to input instructions of a user.

A touch screen panel may be provided on a front face of an image display device to convert positions directly contacting a person's hand or an object into electrical signals. Therefore, the instructions selected at the contact position may be received as the input signals. The touch screen panel may replace a separate input device (such as a keyboard and a mouse) that is operated by being connected with the image display device. Thus, the use field of the touch screen panel is being expanded gradually.

SUMMARY

It is a feature of an embodiment to provide a touch screen panel and a fabricating method for the same capable of maximizing an effect of an anti-reflection coating.

It is another feature of an embodiment to provide a touch screen panel and a fabricating method for the same in which an anti-reflection layer made of an inorganic mixture may be provided at a surface of the touch screen panel using a difference in specific gravities of components of the inorganic mixture.

It is another feature of an embodiment to provide a touch screen panel and a fabricating method for the same in which an antireflective layer may be provided at a surface of the touch screen panel using a printing method.

At least one of the above and other features and advantages may be realized by providing a touch screen panel, including a substrate having a plurality of sensing patterns thereon, and an anti-reflection layer on the substrate, the anti-reflection layer including at least two inorganic materials and having a stacked structure of at least two layers having different refractive indexes, layers of the anti-reflection layer being divided from a mixture by a difference in specific gravity of the least two inorganic materials.

The plurality of sensing patterns may include a plurality of first sensing patterns that are disposed on a first surface of the substrate and are connected to each other along a first direction, and a plurality of second sensing patterns that are isolated from the first sensing patterns and alternately disposed to the first sensing patterns so as not to overlap with the first sensing patterns.

The plurality of sensing patterns may include a plurality of first sensing patterns that are disposed on a first surface of the substrate and are connected to each along a first direction, and a plurality of second sensing patterns that are on a same layer and alternately disposed to the first sensing patterns, the second sensing patterns being connected to each other in a second direction through a connection pattern.

The plurality of sensing patterns may include a plurality of first and second sensing patterns disposed on opposing surfaces of the substrate to be alternately disposed to each other.

The plurality of sensing patterns may include a plurality of first sensing patterns connected to each other along a first direction, and a plurality of second sensing patterns connected along a second direction on a surface of another substrate provided to be opposite to the substrate, and may be alternately disposed to the first sensing patterns so as not to overlap with the first sensing patterns.

The anti-reflection layer may be implemented as a liquid inorganic mixture solution that is dried to form the stacked structure.

The at least two inorganic materials may include at least two of $SiO_2$, $TiO_2$, and $ZrO_2$.

$SiO_2$ may be included at a ratio of about 20 to about 40% of the entirety of the at least two inorganic materials.

$TiO_2$ may be included at a ratio of about 50 to about 70% of the entirety of the at least two inorganic materials.

The at least two inorganic materials may be a mixture of $SiO_2$ and $TiO_2$, $SiO_2$ and $ZrO_2$, or $SiO_2$ and $TiO_2$ and $ZrO_2$.

The anti-reflection layer may include $SiO_2$ and $TiO_2$, the at least two layers may include a first layer and a second layer, the first layer may contain a greater concentration of $TiO_2$ than the second layer, and the second layer may contain a greater concentration of $SiO_2$ than the first layer.

The first layer may be adjacent to the substrate, and between the substrate and the second layer.

The anti-reflection layer may include $ZrO_2$, and the first layer may contain a greater concentration of $ZrO_2$ than the second layer.

The first layer may contain $SiO_2$, and the second layer may contain $TiO_2$.

The second layer may contain $ZrO_2$.

At least one of the above and other features and advantages may also be realized by providing a fabricating method of a touch screen panel, the method including providing a substrate having a plurality of sensing patterns, applying a liquid inorganic mixture to a surface of the substrate, the liquid inorganic mixture including a solvent and at least two inorganic materials, and, after applying the liquid inorganic mixture to the surface of the substrate, removing the solvent to form an anti-reflection layer having a stacked structure of at least two layers having different refractive indexes, the at least two layers being divided by a difference in specific gravities of the at least two inorganic materials.

Applying the liquid inorganic mixture to the surface of the substrate may include a gravure printing process.

The liquid inorganic mixture may include at least two of $SiO_2$, $TiO_2$, and $ZrO_2$.

The liquid inorganic mixture may include a mixture of $SiO_2$ and $TiO_2$, $SiO_2$ and $ZrO_2$, or $SiO_2$ and $TiO_2$ and $ZrO_2$.

A thickness and a refractive index of the anti-reflection layer may be controlled by controlling, in the liquid inorganic mixture, a ratio of an inorganic material having a relatively low specific gravity and an inorganic material having a relatively high specific gravity.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
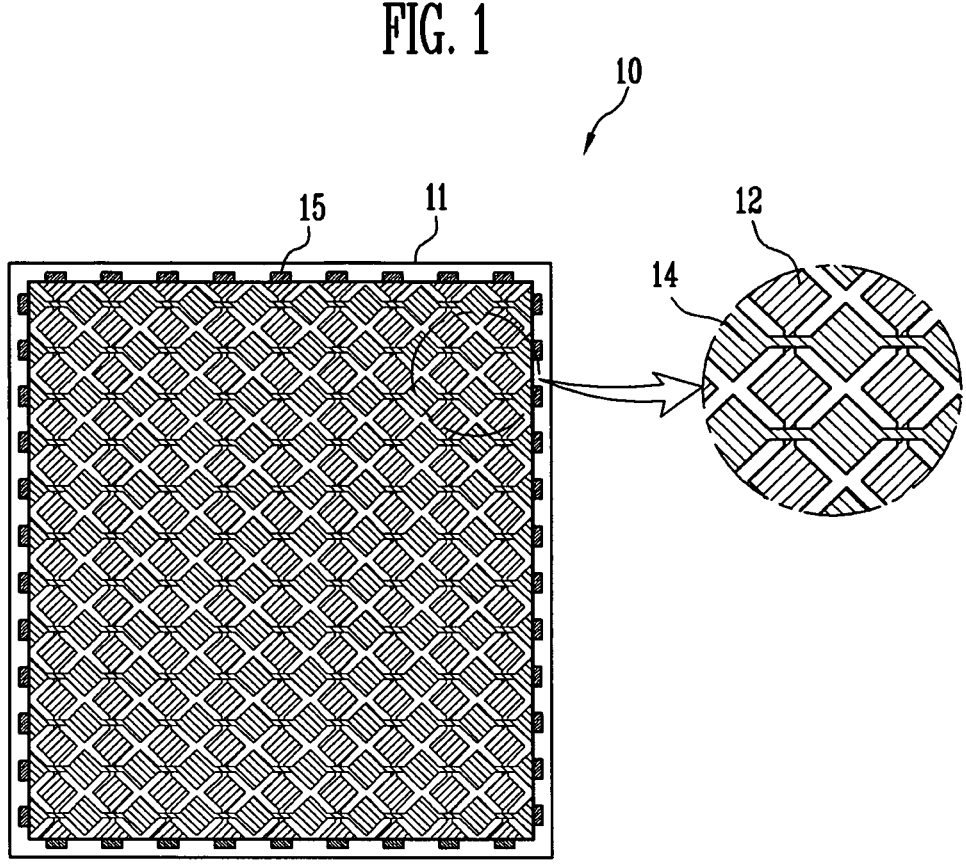
FIG. 1 illustrates a plan view showing a touch screen panel according to an embodiment.

Korean Patent Application No. 10-2010-0039539, filed on Apr. 28, 2010, in the Korean Intellectual Property Office, and entitled: "Touch Screen Panel and Fabricating Method for the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout Herein, references to % of a mixture are references to weight percentage, unless defined otherwise.

An embodiment relates to a touch screen panel having an anti-reflection (AR) layer formed a surface thereof, and a fabricating method thereof. In implementing the touch screen panel, a resistive type, a light sensing type, a capacitive type, etc., of touch screen panel may be implemented, and a method for implementing the touch screen panel can be variously applied. A capacitive touch screen panel will be described in the following embodiments, but embodiments are not limited thereto.

Figure 2:
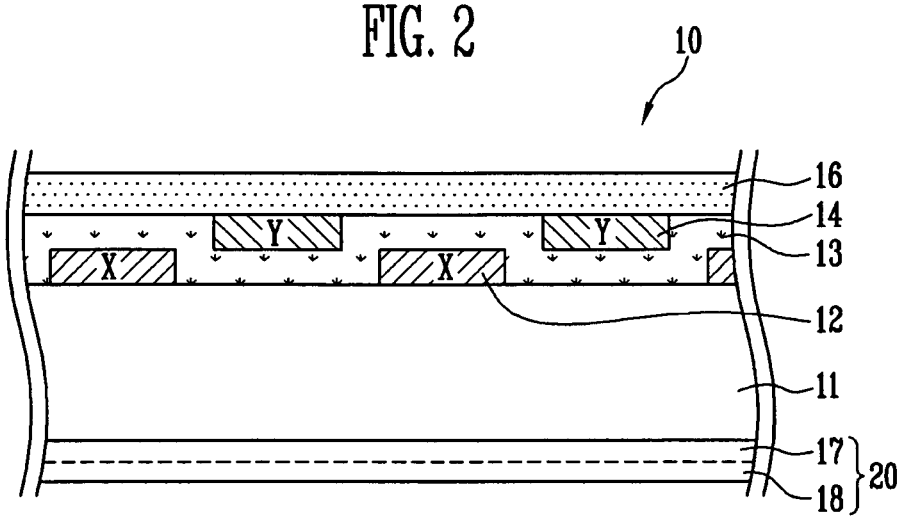
FIG. 2 illustrates a cross-sectional view showing main parts of the touch screen panel shown in FIG. 1.

FIG. 1 illustrates a plan view showing a touch screen panel according to an embodiment, and FIG. 2 illustrates a cross-sectional view showing main parts of the touch screen panel shown in FIG. 1.

Referring to FIGS. 1 and 2, a touch screen panel 10 according to an embodiment may include a plurality of sensing patterns 12 and 14 that are formed on a first surface of the substrate 11, metal patterns 15 that connect the sensing patterns 12 and 14 to position detection lines (not shown), and an insulating layer 16 that is formed to cover the sensing patterns 12 and 14.

The sensing patterns 12 and 14 may be alternately disposed to each other, and may include X sensing patterns 12 and Y sensing patterns 14 formed to be connected to each other in one column having the same X coordinates and in one row having the same Y coordinates.

For example, the X sensing patterns 12 may be formed of the plurality of X patterns formed so that the sensing patterns disposed in one column having the same X coordinates along a first direction (column direction) are connected to each other. The Y sensing patterns 140 may be formed of the plurality of Y patterns formed so that the sensing patterns disposed in one row having the same Y coordinates along a second direction (row direction) are connected to each other.

The X and Y sensing patterns 12 and 14 may be interposed between the insulating layer 13 and formed at different layers.

In this case, the X sensing patterns 12 may be patterned to be connected to each other in a first direction from a patterning step, and the Y sensing patterns 140 may be patterned to be connected to each other in a second direction. Therefore, a process of forming separate contact holes and connection patterns may be omitted, thereby reducing the number of masks and simplifying the process. In another implementation, the X and Y sensing patterns 12 and 14 may be formed on the same layer. In this case, any one type of sensing patterns among the X and Y sensing patterns 12 and 14 may be formed to be connected to each other in the first or second direction at the patterning step, and the other sensing patterns may be connected to each other in the first and second directions at a step of forming the contact hole and the connection pattern.

The metal patterns 15 may be disposed at an edge region of a region in which the X and Y sensing patterns 12 and 14 are formed, thereby connecting the X and Y sensing patterns 12 and 14 to the position detection line (not shown). For example, the metal patterns 15 may electrically connect the X and Y sensing patterns 12 and 14 in one column or one row unit to the position detection line, thereby supplying the contact position detection signal to a driving circuit, etc. The insulating layer 16 may be made of a transparent insulating material covering the sensing patterns 12 and 14.

The touch screen panel may be a capacitive touch screen panel and, when it is touched with a contact object such as a person's hand or a touch stick, etc., the change in capacitance according to the contact position may be transferred to the driving circuit side via the metal patterns 15 and the position detection line from the sensing patterns 12 and 14. The change in capacitance may be converted into an electrical signal by an X and Y input processing circuit (not shown), etc., thereby indicating the contact position.

In an embodiment, the anti-reflection (AR) layer 20 may be formed on the second surface of the substrate 11. The anti-reflection layer 20 may be formed by applying a liquefied inorganic mixture on the second surface of the substrate 11 through, e.g., a gravure printing process. The liquefied inorganic mixture may be a solution, suspension, etc. An anti-reflection effect may be maximized using a difference in specific gravity for each component of the inorganic mixture.

The gravure printing process, which is a process that rakes out extra ink by covering ink on a concave plate, transfers ink on the substrate by using a transfer roll. Thus, by using the transfer roll corresponding to an area of the desired substrate, a pattern may be formed by a one-time transfer even in the case of a large-area display device. The term "ink" means a material to be printed, and in the present embodiment, the liquefied inorganic mixture corresponds to the ink.

In the present embodiment, the final anti-reflection layer 20 may be formed by mixing at least two inorganic materials as a solute, making it into a solution through a solvent and forming it on the second surface of the substrate 11, and then removing the solvent through a curing process. It will be appreciated that a solution, suspension, etc., may each be used in the same manner.

In more detail, when printing the inorganic mixture solution and then performing the curing process thereon, a component having a high specific gravity and a component having low specific gravity among the inorganic materials included in the inorganic mixture may be divided, either partially or completely, such that the layers 17 and 18 each having a different refractive index are formed.

The layers 17 and 18 of the anti-reflection layer 20 according to the present embodiment, which is divided by the specific gravity difference of at least two inorganic materials included in the inorganic mixture solution, may each have a different refractive index. Thus, the stacked structure of layers 17 and 18 having different refractive indexes may be implemented by one-time printing, e.g., a single pass in which two or more different inorganic materials having different refractive indexes are applied, and the anti-reflection effect may be obtained by the matching of the refractive index of the inorganic mixture.

The inorganic mixture may be a mixture of at least two inorganic materials of $SiO_2$, $TiO_2$, and $ZrO_2$. The refractive and specific gravity of each of these inorganic materials is described in the following Table 1.

TABLE 1

| Composition | Refractive index | Specific gravity |
|---|---|---|
| $SiO_2$ | 1.46 | 2.6 |
| $TiO_2$ | 2.35 | 3.5 |
| $ZrO_2$ | 2.15 | 5.95 |

The inorganic materials may have different refractive indexes and specific gravities. The inorganic mixture may be a mixture of $SiO_2$ as an inorganic material having low refractive index and specific gravity, and $TiO_2$ and/or $ZrO_2$ as inorganic materials having a high specific gravity. The inorganic mixture may be a mixture of $SiO_2$ and $TiO_2$, $SiO_2$ and $ZrO_2$, or $SiO_2$, $TiO_2$, and $ZrO_2$.

The following Table 2 shows experimental data of examples of forming the anti-reflection layer 20 formed of two layers having different refractive index by controlling a mixing ratio of each inorganic material in forming the inorganic mixture by mixing $SiO_2$, $TiO_2$, and $ZrO_2$.

TABLE 2

| Condition | Mixing ratio of inorganic material | | | Printing thickness (Å) | Actual measuring result |
|---|---|---|---|---|---|
| | $SiO_2$ | $TiO_2$ | $ZrO_2$ | | |
| 1 | 20 | 70 | 10 | 545 | Second layer: 138 Å (refractive index n = 1.71) First layer: 408 Å (refractive index n = 1.94) |
| 2 | 30 | 60 | 10 | 530 | Second layer: 217 Å (refractive index n = 1.65) First layer: 316 Å (refractive index n = 1.91) |
| 3 | 40 | 50 | 10 | 695 | Second layer: 454 Å (refractive index n = 1.63) First layer: 242 Å (refractive index n = 1.85) |

According to condition 1, the final anti-reflection layer 20 was implemented by mixing $SiO_2$, $TiO_2$, and $ZrO_2$ at 2:7:1, respectively, dissolving and/or liquefying it with a solvent, forming it on the second surface of the substrate 11 by the gravure printing process, and then removing the solvent by the curing process. The entire thickness of the implemented anti-reflection layer was 545 Å in total and had a structure that it was divided into the first layer and the second layer.

The first layer 17 may be formed in a state where contents of the inorganic materials having large specific gravity, e.g., $TiO_2$ or $ZrO_2$, are larger, and the second layer 18 may formed in a state where the contents of the inorganic material having small specific gravity, e.g., $SiO_2$ are larger.

Referring to Table 1, according to condition 1, the thickness of the first layer 17 was 408 Å and the refractive index (n) was 1.94, and the thickness of the second layer 18 was 138 Å and the refractive index (n) was 1.71.

Similarly, the case of condition 2 implemented the anti-reflection layer 20 by mixing $SiO_2$, $TiO_2$, and $ZrO_2$, respectively, at a ratio of 3:6:1. According to condition 2, the entire thickness of the anti-reflection layer 20 was 530 Å, the thickness of the first layer 17 was 316 Å and the refractive index thereof was 1.91, and the thickness of the second layer 18 was 217 Å and the refractive index (n) was 1.65.

Finally, the case of condition 3 implemented the anti-reflection layer 20 by mixing $SiO_2$, $TiO_2$, and $ZrO_2$, respectively, at a ratio of 4:5:1. According to condition 3, the entire thickness of the anti-reflection layer 20 was 695 Å, the thickness of the first layer 17 was 242 Å and the refractive index (n) thereof was 1.85, and the thickness of the second layer 18 was 454 Å and the refractive index (n) was 1.63.

As can be seen from Table 2, the thickness and refractive index of the first and second layers 17 and 18 forming the anti-reflection layer 20 may be controlled by controlling a ratio of $SiO_2$ (having a relatively small specific gravity) and $TiO_2$ (having a relatively large specific gravity) in the inorganic mixture. Through this, the optimal combination capable of maximizing the anti-reflection effect suitable for the specific TSP panel may be implemented.

In an embodiment, $ZrO_2$ may be included in the inorganic mixture in order to improve the film characteristics of the anti-reflection layer 20, and may serve to solidify the bonding between $SiO_2$ and $TiO_2$.

Example structures of the touch screen panel including the anti-reflection layer 20 according to the present embodiment is shown in FIGS. 1 and 2. Additionally, FIGS. 3A to 3C illustrate cross-sectional views of touch screen panels according to various embodiments, in which the X and Y sensing patterns 12 and 14 are arrayed in various forms.

Figure 3A:
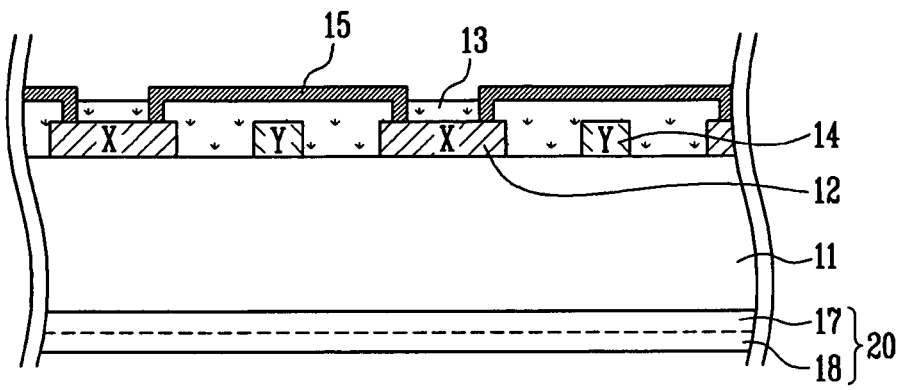
FIGS. 3A to 3C illustrate cross-sectional views of touch screen panels according to various embodiments.

Referring first to FIG. 3A, the X and Y sensing patterns 12 and 14 at one surface of the substrate 11 may be implemented as a structure in which they are formed on a same layer. The Y sensing patterns 14 may be formed to be connected to each other in the first direction at the patterning step, and the X sensing patterns 12 may be connected to each other in a second direction through a contact hole and the connection pattern 15 that are formed on the insulating layer 13.

Figure 3B:
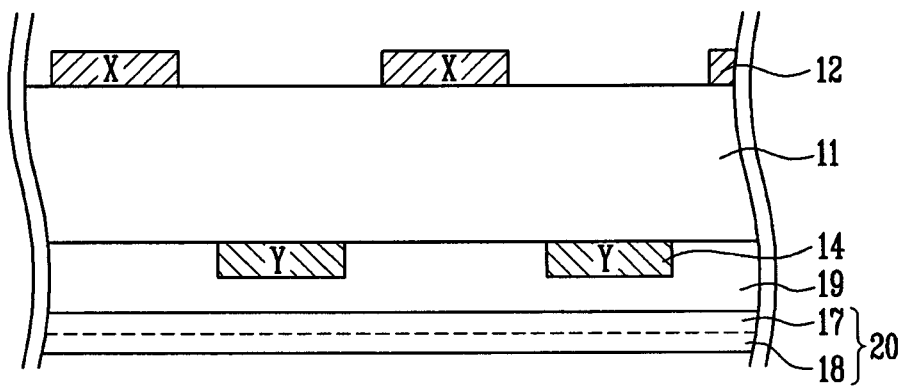

Further, the embodiment of FIG. 3B shows a structure in which the X and Y sensing patterns 12 and 14 are formed on both surfaces of the substrate 11, respectively. In this case, a planarization layer 19 may be formed to be disposed between the Y sensing patterns 14 and the anti-reflection layer 20 in forming the anti-reflection layer 20 on the second surface of the substrate 11.

Figure 3C:
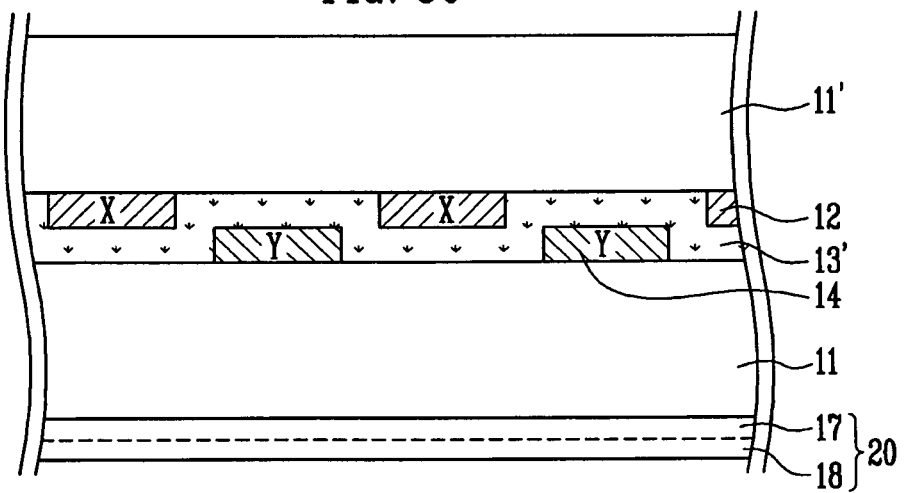

Further, the embodiment of FIG. 3C shows a structure in which the X sensing patterns 12 are formed on the first surface of the substrate 11 and the Y sensing patterns 12 are formed on one surface of another substrate 11' provided to be opposite to the substrate 11. A dielectric layer 13' may be formed between the two substrates 11 and 11'. The dielectric layer 13' may be implemented by, e.g., a liquid crystal layer.

The X sensing patterns 12 may be formed to be connected to each other along the first direction, and the Y sensing patterns 14 may be alternately disposed to the X sensing patterns 12 so as not to be overlap with the X sensing patterns 12. In the various types of the touch screen panels, the anti-reflection layer 20 may be formed on the second surface of the substrate 11 in the same structure as the embodiment described through FIGS. 1 and 2 and, therefore, the detailed description thereof will be not be repeated.

Figure 4A:
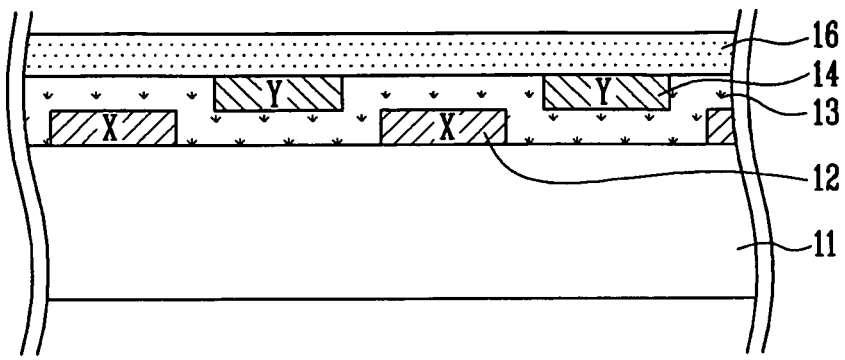
FIGS. 4A to 4C illustrate cross-sectional views of stages in a method of fabricating a liquid crystal display device according to an embodiment.
Figure 4B:
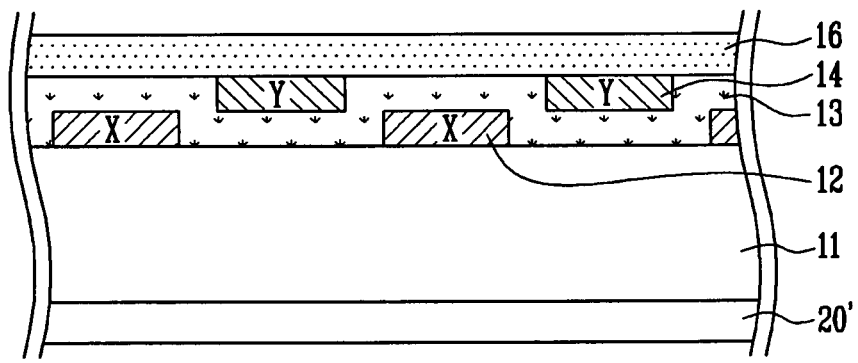
Figure 4C:
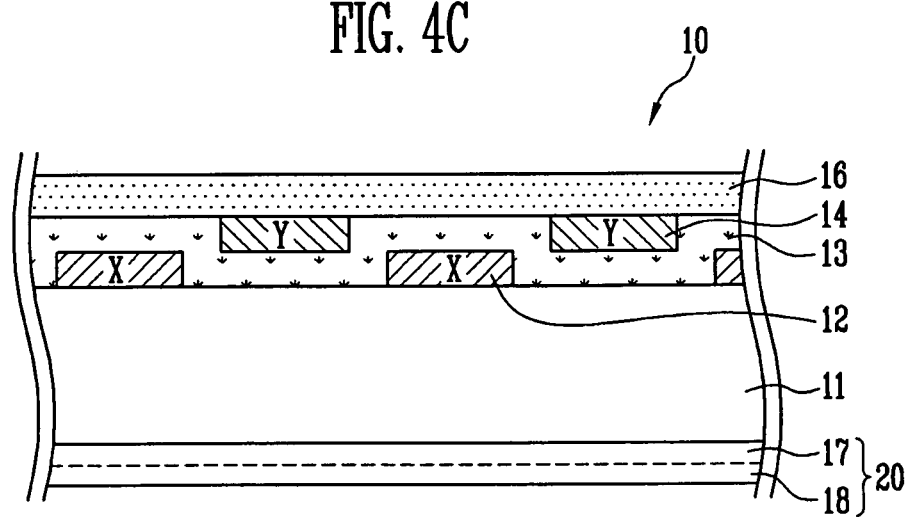

FIGS. 4A to 4C illustrate cross-sectional views of stages in a method of fabricating a liquid crystal display device according to an embodiment. Although the structure of the touch screen panel of FIG. 1 is described as an example, this is only one example and the present embodiment is not limited thereto.

Referring first to FIG. 3A, the X and Y sensing patterns 12 and 14 isolated from each other by the insulating layer 13, metal patterns (not shown) that connect the sensing patterns 12 and 14 to a position detection line (not shown), and the insulating layer 16 covering the sensing patterns 12 and 14 may be formed on a first surface of the substrate 11. This may be operated as a capacitive touch screen panel through the devices formed on the first surface of the substrate 11. Therefore, when a contact object, such as a person's hand, touches the touch screen panel, the change in capacitance according to the contact position may be transferred to the driving circuit side via the metal patterns and the position detection line from the sensing patterns 12 and 14, and the change in capacitance may be converted into an electrical signal by the X and Y input processing circuit (not shown), etc., to indicate the contact position.

Next, referring to FIG. 4B, the liquefied inorganic mixture 20' may be applied on the second surface of the substrate 11. In the present embodiment, the inorganic mixture solution 20' may be formed on the second surface of the glass substrate by a printing process, e.g., a gravure printing process.

Since the gravure printing process rakes out extra ink by covering ink on a concave plate and transfers ink on the substrate using a transfer roll, by using the transfer roll corresponding to an area of the desired substrate, a pattern may be formed by one-time transfer even in the case of a large-area display device. Herein "ink" means a material to be printed and, in the present embodiment, the liquefied inorganic mixture corresponds to the ink.

The present embodiment implements the final anti-reflection layer 20 by mixing at least two inorganic materials as a solute, making it into a solution through a solvent and forming it on the second surface of the substrate 11.

In the present embodiment, the inorganic mixture is a mixture of at least two inorganic materials of $SiO_2$, $TiO_2$, and $ZrO_2$. The refractive index and specific gravity of each inorganic material is described in Table 1. The mixed inorganic materials may have a different refractive index and specific gravity, e.g., the mixture may be a mixture of $SiO_2$ as an inorganic material having low refractive index and specific gravity, and $TiO_2$ and/or $ZrO_2$ as an inorganic material having a high specific gravity. Thus, the inorganic mixture may be a mixture of, e.g., $SiO_2$ and $TiO_2$, $SiO_2$ and $ZrO_2$, or $SiO_2$, $TiO_2$, and $ZrO_2$.

Next, as shown in FIG. 4C, the solvent of the inorganic mixture solution may be removed through the curing process to implement the anti-reflection layer 20. In more detail, when printing the inorganic mixture solution and then performing the curing process thereon, the component having high specific gravity and the component having low specific gravity among the inorganic materials included in the inorganic mixture may be partially or entirely divided, or separated on average, such that layers 17 and 18 each having a different refractive index are formed.

The anti-reflection layer 20 according to the present embodiment has different refractive index by the difference in the specific gravity for each component of the mixed inorganic material. Thus, the stacked structure of two layers 17 and 18 having different refractive index may be implemented by one-time printing and the anti-reflection effect may be obtained by the matching of the refractive index of the inorganic mixture.

Further, as can be appreciated from the foregoing Table 2, the thickness and each refractive index of the first and second layers 17 and 18 forming the anti-reflection layer may be controlled by controlling a ratio of $SiO_2$ having a relatively small specific gravity and $TiO_2$ having a relatively large specific gravity with respect to the inorganic mixture. Through this, the optimal combination capable of maximizing the anti-reflection effect suitable for the specific TSP panel may be implemented.

Generally, a touch screen panel may be attached to the upper portion of a flat display panel, such as a liquid crystal display device, etc., such that the flat display panel has problems such as transmittance degradation and display quality degradation due to surface reflection. Therefore, there is a need to apply a high definition technology to the flat display device to which the touch screen panel is attached. An example of the high definition technology may include an anti-reflection (AR) process. The anti-reflection layer may be formed on one surface of the touch screen panel to reduce the amount of light reflected from the surface of the touch screen panel, thereby making it possible to overcome the defect problem of visibility due to the reflected light.

The anti-reflection layer may be implemented through a repetitive process of sequentially depositing a plurality of inorganic layers having different refractive layers, wherein the deposition process is performed within a high-vacuum chamber. However, when the anti-reflection layer is formed by such a method, the frequency of the occurrence of defects may be increased due to the complicated process, and the manufacturing costs may be increased due to the additional process costs.

In contrast, as described above, embodiments may provide an anti-reflection layer on a surface of the touch screen panel of the inorganic mixture by, e.g., a gravure printing process, and may make it possible to minimize the fabricating costs. Further, the anti-reflection layer may be applied, e.g., printed, only on the necessary region in a pattern, thereby making it possible to form the anti-reflection layer on a mother substrate state, i.e., prior to cutting the original substrate into cell units. In addition, embodiments may implement a plurality of layers using a difference in specific gravities of components of an inorganic mixture when forming the anti-reflection layer, thereby making it possible to maximize the effect of the anti-reflection coating while using a simple process.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:
1. A touch screen panel, comprising:
a substrate having a plurality of sensing patterns thereon; and
an anti-reflection layer on the substrate, the anti-reflection layer including at least two inorganic materials and having a stacked structure of at least two sublayers having different refractive indices, each of the at least two sublayers of the anti-reflection layer including the at least two inorganic materials and the at least two sublayers of the anti-reflection layer being divided from a mixture by a difference in specific gravity of the at least two inorganic materials, wherein:
the at least two sublayers of the anti-reflection layer include a first sublayer and a second sublayer, the first sublayer and the second sublayer each including $SiO_2$ and $TiO_2$, the first sublayer contains a greater concentration of $TiO_2$ than the second sublayer, and the second sublayer contains a greater concentration of $SiO_2$ than the first sublayer.

2. The touch screen panel as claimed in claim 1, wherein the plurality of sensing patterns includes:

a plurality of first sensing patterns that are disposed on a first surface of the substrate and are connected to each other along a first direction; and a plurality of second sensing patterns that are isolated from the plurality of first sensing patterns and alternately disposed to the plurality of first sensing patterns so as not to overlap with the plurality of first sensing patterns.

3. The touch screen panel as claimed in claim 1, wherein the plurality of sensing patterns includes:

a plurality of first sensing patterns that are disposed on a first surface of the substrate and are connected to each along a first direction; and a plurality of second sensing patterns that are on the same layer as the plurality of first sensing patterns and alternately disposed to the plurality of first sensing patterns, the plurality of second sensing patterns being connected to each other in a second direction through a connection pattern.

4. The touch screen panel as claimed in claim 1, wherein the plurality of sensing patterns includes a plurality of first sensing patterns and a plurality of second sensing patterns disposed on opposing surfaces of the substrate to be alternately disposed to each other.

5. The touch screen panel as claimed in claim 1, wherein the plurality of sensing patterns includes:

a plurality of first sensing patterns are connected to each other along a first direction, and a plurality of second sensing patterns are connected along a second direction on a surface of another substrate that is spaced apart from the substrate in an opposing relationship to the substrate, the plurality of second sensing patterns being alternately disposed to the plurality of first sensing patterns so as not to overlap with the plurality of first sensing patterns.

6. The touch screen panel as claimed in claim 1, wherein the anti-reflection layer is implemented as a liquid inorganic mixture solution that is dried to form the stacked structure.

7. The touch screen panel as claimed in claim 1 wherein $SiO_2$ is included in an amount of about 20 to about 40 wt % of the entirety of the at least two inorganic materials.

8. The touch screen panel as claimed in claim 1, wherein $TiO_2$ is included in an amount of about 50 to about 70 wt % of the entirety of the at least two inorganic materials.

9. The touch screen panel as claimed in claim 1, wherein the first sublayer is adjacent to the substrate, and between the substrate and the second sublayer.

10. The touch screen panel as claimed in claim a 1, wherein:

the first sublayer and the second sublayer of the anti-reflection layer further include $ZrO_2$, and the first sub layer contains a greater concentration of $ZrO_2$ than the second sublayer.

11. The touch screen panel as claimed in claim 1, wherein the second sublayer further contains $ZrO_2$.

12. A fabricating method of a touch screen panel, the method comprising:

providing a substrate having a plurality of sensing patterns;

applying a liquid inorganic mixture to a surface of the substrate, the liquid inorganic mixture including a solvent and at least two inorganic materials, wherein the at least two inorganic materials include $SiO_2$ and $TiO_2$; and after applying the liquid inorganic mixture to the surface of the substrate, removing the solvent to form an anti-reflection layer having a stacked structure of at least two sublayers having different refractive indices, each of the at least two sublayers of the anti-reflection layer including the at least two inorganic materials and the at least two sublayers being divided by a difference in specific gravities of the at least two inorganic materials, the at least two sublayers of the anti-reflection layer including a first sublayer and a second sublayer, the first sublayer and the second sublayer each including $SiO_2$ and $TiO_2$, the first sublayer containing a greater concentration of $TiO_2$ than the second sublayer, and the second sublayer contains a greater concentration of $SiO_2$ than the first sublayer.

13. The method as claimed in claim 12, wherein applying the liquid inorganic mixture to the surface of the substrate includes a gravure printing process.

14. The method as claimed in claim 12, wherein the liquid inorganic mixture includes a mixture further includes $ZrO_2$.

15. The method as claimed in claim 12, wherein the thickness and the refractive index of the anti-reflection layer are controlled by controlling, in the liquid inorganic mixture, the ratio of $SiO_2$ and $TiO_2$.

\* \* \* \* \*